United States Patent
Forlong et al.

(10) Patent No.: US 11,536,003 B1
(45) Date of Patent: Dec. 27, 2022

(54) MANHOLE INSERTS AND MANHOLE INSERT GASKET FABRICATION METHODS

(71) Applicants: Michael Forlong, Tampa, FL (US); David L. Neathery, Shreveport, LA (US)

(72) Inventors: Michael Forlong, Tampa, FL (US); David L. Neathery, Shreveport, LA (US)

(*) Notice: Subject to any disclaimer, the term of this patent is extended or adjusted under 35 U.S.C. 154(b) by 920 days.

(21) Appl. No.: 16/252,929

(22) Filed: Jan. 21, 2019

Related U.S. Application Data (62) Division of application No. 15/427,145, filed on Feb. 8, 2017, now abandoned.

(51) Int. Cl.
*E02D 29/14* (2006.01)
*B05D 1/26* (2006.01)
*B23P 15/00* (2006.01)

(52) U.S. Cl.
CPC ............. *E02D 29/14* (2013.01); *B05D 1/26* (2013.01); *B23P 15/00* (2013.01); *E02D 29/149* (2013.01); *E02D 2300/0004* (2013.01); *E02D 2450/00* (2013.01); *Y10T 29/49297* (2015.01); *Y10T 29/49982* (2015.01)

(58) Field of Classification Search
CPC .............................................. E02D 29/12–149
See application file for complete search history.

(56) References Cited

U.S. PATENT DOCUMENTS

| | | | |
|---|---|---|---|
| 3,147,014 A | | 9/1964 | Ohnstad |
| 3,248,119 A | * | 4/1966 | Smith ................. F16J 15/06 277/913 |
| 3,621,623 A | * | 11/1971 | Downes ............... E02D 29/124 52/100 |
| 3,780,773 A | * | 12/1973 | Haugen .................. B65D 59/06 52/421 |
| 3,832,438 A | | 8/1974 | Ditcher |
| 3,969,847 A | * | 7/1976 | Campagna ............ E02D 29/149 137/512.1 |
| 3,980,311 A | | 9/1976 | Ditcher |
| 4,440,407 A | | 4/1984 | Gagas |
| 4,469,115 A | | 9/1984 | Rockafellow |
| 4,650,365 A | * | 3/1987 | Runnels ................. E02D 29/14 404/26 |
| 4,759,656 A | * | 7/1988 | Wilson ................... E02D 29/14 277/642 |
| 4,772,154 A | | 9/1988 | Caroulle |
| 4,834,574 A | * | 5/1989 | Bowman ............... E02D 29/124 404/26 |
| 4,919,564 A | | 4/1990 | Neathery et al. |
| 4,934,715 A | | 6/1990 | Johnson |

(Continued)

FOREIGN PATENT DOCUMENTS

DE 102005009727 A1 * 9/2006 ............ E02D 29/14
DE 202011050837 U1 * 12/2011 ............ E02D 29/14

*Primary Examiner* — Jacob J Cigna
(74) *Attorney, Agent, or Firm* — R. Keith Harrison (57) ABSTRACT

Methods of fabricating a manhole insert gasket on a manhole insert flange of a manhole insert may include inverting a manhole insert having a manhole insert flange; forming a manhole insert gasket by dispensing a liquid gasket material onto the manhole insert flange along at least one circular dispensing path, the liquid gasket material including a synthetic silicone elastomer; and curing the gasket material.

19 Claims, 10 Drawing Sheets

(56) References Cited

U.S. PATENT DOCUMENTS

| | | | |
|---|---|---|---|
| 4,957,389 A | 9/1990 | Neathery | |
| 4,969,771 A * | 11/1990 | Bowman | E02D 29/14 404/26 |
| 5,039,248 A * | 8/1991 | Bowman | E02D 29/124 404/26 |
| 5,090,713 A * | 2/1992 | Johnson | E02D 29/14 277/648 |
| 5,201,600 A * | 4/1993 | Topf, Jr. | E02D 29/14 156/295 |
| RE34,550 E * | 2/1994 | Bowman | E02D 29/124 404/26 |
| 5,316,045 A * | 5/1994 | Taylor | F16L 55/11 138/89 |
| 5,382,113 A * | 1/1995 | Chilton | E02D 29/12 404/25 |
| 5,404,676 A * | 4/1995 | Devlin | E02D 29/14 49/463 |
| 5,431,553 A * | 7/1995 | Topf, Jr. | E02D 29/12 264/32 |
| 5,806,566 A * | 9/1998 | Taylor | F16L 55/11 220/789 |
| 5,852,901 A * | 12/1998 | Meyers | E03F 5/02 220/4.26 |
| 5,951,200 A * | 9/1999 | Barton | E02D 29/12 404/25 |
| 5,957,618 A * | 9/1999 | Sims | E02D 29/12 404/25 |
| 5,966,876 A * | 10/1999 | Neathery | E02D 29/12 70/164 |
| 6,161,984 A * | 12/2000 | Sinclair | E02D 29/1427 404/25 |
| 6,196,760 B1 * | 3/2001 | Sinclair | E02D 29/1409 404/26 |
| 6,623,673 B1 | 9/2003 | Becker et al. | |
| 7,748,927 B2 * | 7/2010 | Neathery | E02D 29/1481 404/25 |
| 7,883,290 B1 * | 2/2011 | Ross | E02D 29/1427 210/163 |
| 8,844,750 B1 | 9/2014 | Thompson | |
| 9,546,466 B2 * | 1/2017 | Wander | E02D 29/1472 |
| 9,695,569 B1 * | 7/2017 | Knowles | E02D 29/1436 |
| 10,011,971 B1 | 7/2018 | Neathery et al. | |
| 2008/0003056 A1 * | 1/2008 | Neathery | E02D 29/127 404/25 |
| 2009/0100768 A1 * | 4/2009 | Baur | E02D 29/14 52/21 |
| 2012/0227168 A1 * | 9/2012 | Paoluccio | E03C 1/1225 4/220 |
| 2013/0186811 A1 | 7/2013 | Kaiser | |
| 2015/0040484 A1 * | 2/2015 | Olch | E06B 7/2314 49/465 |
| 2016/0115668 A1 * | 4/2016 | Halbirt | E02D 29/1427 49/506 |
| 2016/0333565 A1 * | 11/2016 | Clinton | E03F 5/041 |

\* cited by examiner

MANHOLE INSERTS AND MANHOLE INSERT GASKET FABRICATION METHODS

CROSS-REFERENCE TO RELATED APPLICATIONS

This is a divisional of U.S. application Ser. No. 15/427,145, filed Feb. 8, 2017 and entitled "MANHOLE INSERTS AND MANHOLE INSERT GASKET FABRICATION METHODS", which application is related to U.S. application Ser. No. 14/798,546, now U.S. Pat. No. 10,011,971, filed Jul. 14, 2015 and entitled MANHOLE INSERTS AND MANHOLE INSERT GASKET FABRICATION METHODS, which application is hereby incorporated by reference herein in its entirety.

FIELD

Illustrative embodiments of the disclosure generally relate to manhole inserts for closing manholes which overlie subterranean sewer systems. More particularly, illustrative embodiments of the disclosure relate to manhole inserts having a manhole insert gasket characterized by enhanced sealing capability and longevity and methods of fabricating manhole insert gaskets on manhole inserts.

BACKGROUND

The background description provided herein is solely for the purpose of generally presenting the context of various illustrative embodiments of the disclosure. Aspects of the background description are neither expressly nor impliedly admitted as prior art against the claimed subject matter.

In sewer systems, manhole structures typically facilitate access to subterranean piping. A typical manhole structure may have a ring-shaped manhole structure frame which encloses a manhole. A manhole insert may be placed in the manhole structure frame to close the manhole and the underlying sewer system from rainwater and other precipitation. A removable manhole cover may be seated in the manhole structure frame to facilitate access to the manhole and the sewer system.

Manhole inserts having a manhole insert gasket characterized by enhanced sealing capability and longevity and methods of fabricating a manhole insert gasket on a manhole insert are needed.

SUMMARY

Illustrative embodiments of the disclosure are generally directed to manhole inserts. An illustrative embodiment of the manhole inserts includes a manhole insert bottom. A manhole insert sidewall may extend from the manhole insert bottom. A manhole insert flange may extend from the manhole insert sidewall. A manhole insert gasket may be provided on the manhole insert flange. The manhole insert gasket may include a synthetic silicone elastomer.

Illustrative embodiments of the disclosure are further generally directed to methods of fabricating a manhole insert gasket on a manhole insert flange of a manhole insert. An illustrative embodiment of the methods includes inverting a manhole insert having a manhole insert flange; forming a manhole insert gasket by dispensing a liquid gasket material onto the manhole insert flange along at least one circular dispensing path, the liquid gasket material including a synthetic silicone elastomer; and curing the gasket material.

BRIEF DESCRIPTION OF THE DRAWINGS

Illustrative embodiments of the disclosure will now be described, by way of example, by reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description. As used herein, relative terms such as "upper" and "lower" are intended to be used in an illustrative and not a limiting sense. In some applications, therefore, those elements which are identified as "upper" may be located beneath those elements which are identified as "lower" in the following detailed description. For purposes of description herein, such relative terms relate to the position of the manhole insert as illustrated in FIG. 6.

Figure 6:
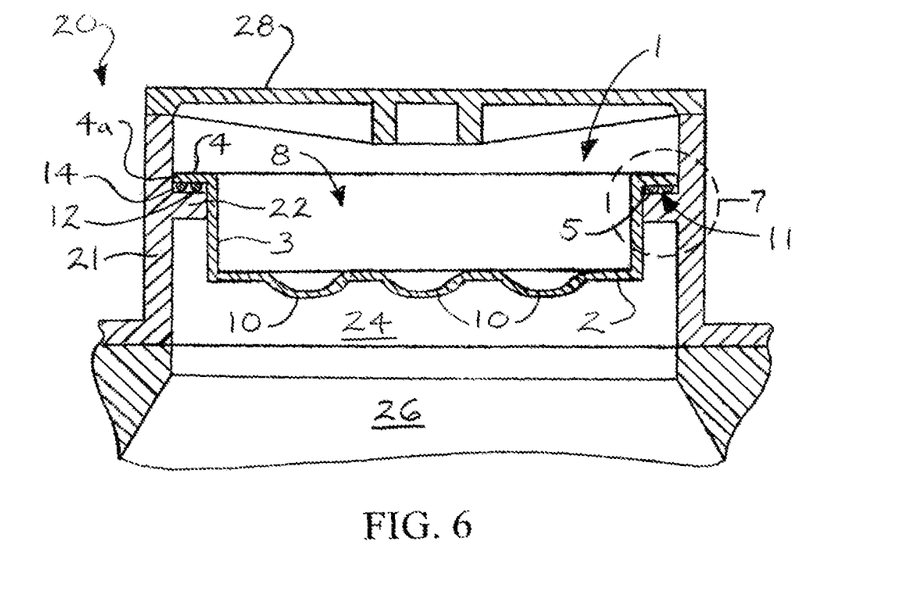
FIG. 6 is a cross-sectional view of the illustrative manhole insert, seated on a manhole structure shoulder inside a manhole structure frame in a manhole structure in typical application of the manhole insert.

Referring initially to FIGS. 1-7 of the drawings, an illustrative embodiment of the manhole insert is generally indicated by reference numeral 1. As illustrated in FIG. 6 and will be hereinafter described, the manhole insert 1 is suitably designed and configured to be placed in a manhole opening 24 inside a manhole structure 20. The manhole structure 20 may include a manhole structure frame 21 which encloses the manhole opening 24 and overlies a typically subterranean sanitary sewer system 26. The manhole insert 1 may prevent rainwater and other precipitation and/or floodwater from flowing into the sewer system 26 and causing the sewer system 26 to overflow to a ground or roadway surface (not illustrated) through the manhole opening 24.

Figure 1:
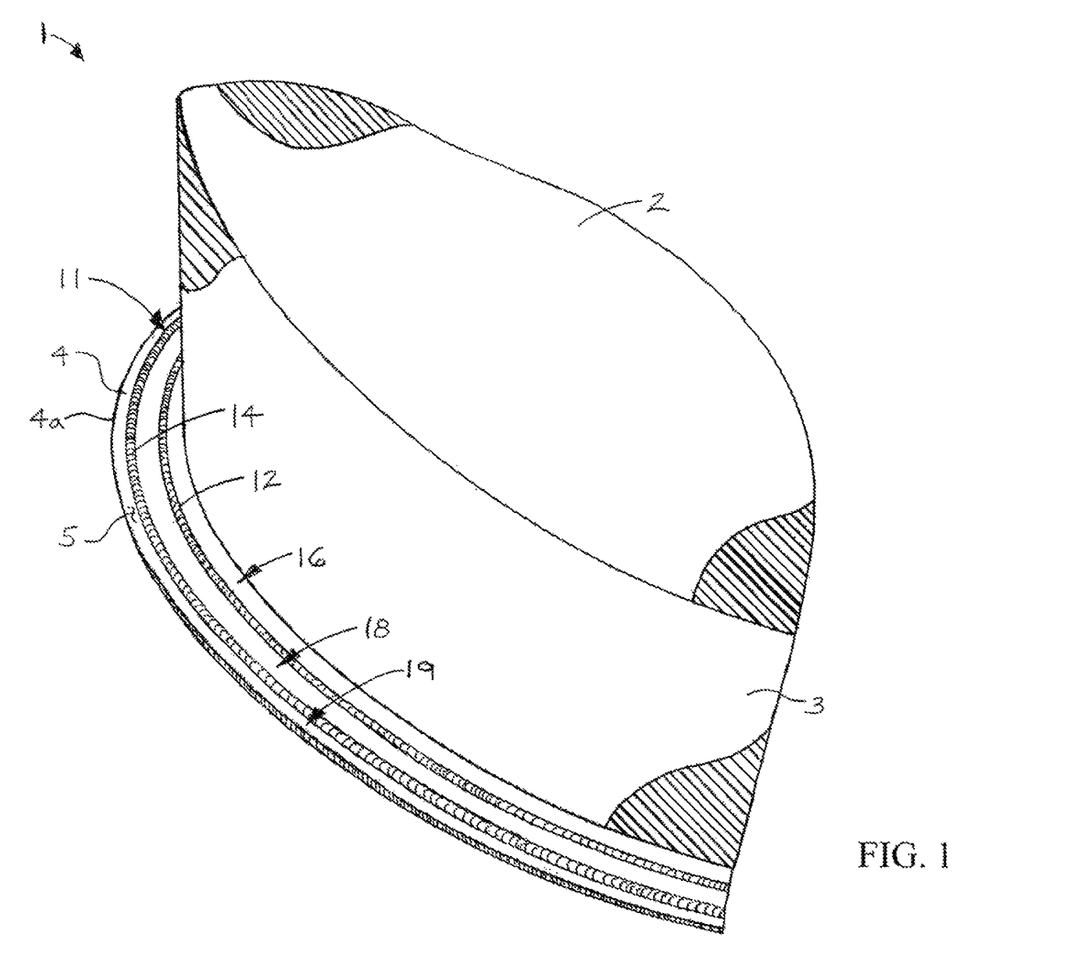
FIG. 1 is a sectional perspective view of an inverted manhole insert according to an illustrative embodiment of the disclosure.
Figure 2:
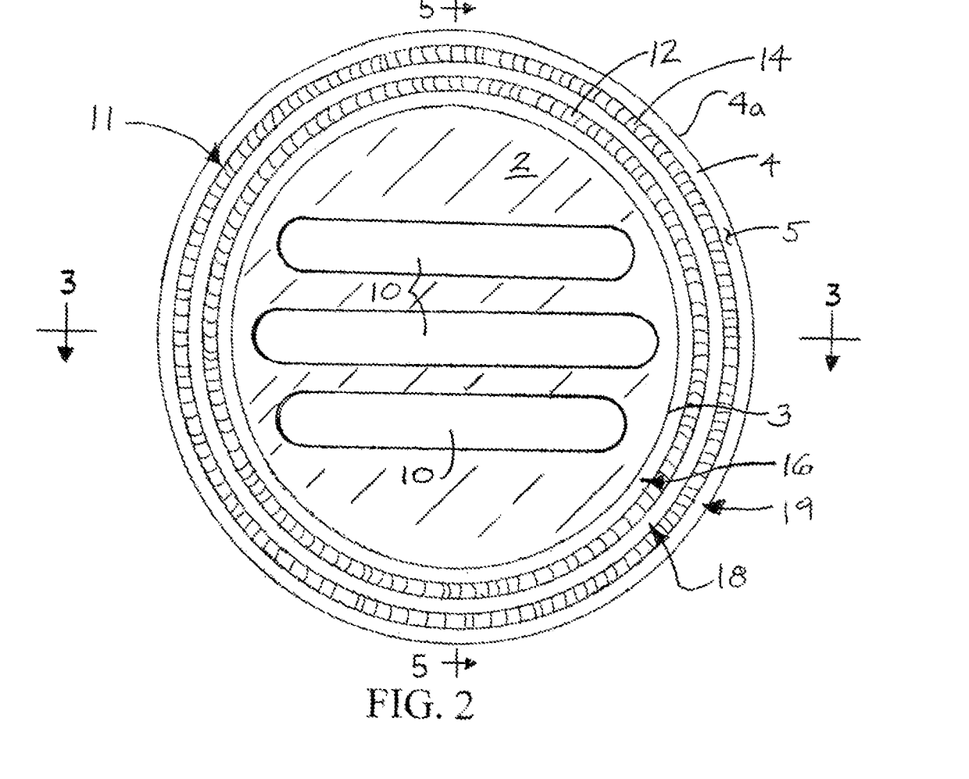
FIG. 2 is a bottom view of the illustrative manhole insert.
Figure 3:
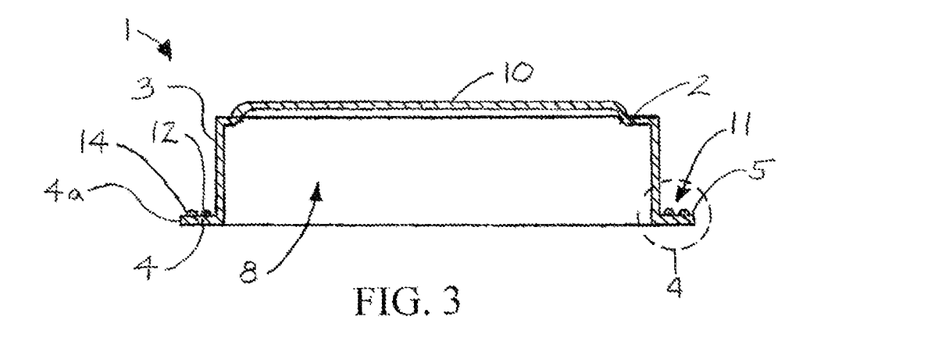
FIG. 3 is a cross-sectional view taken along section lines 3-3 in FIG. 2.

The manhole insert 1 may be generally pan-shaped with a flat or planar manhole insert bottom 2. In some embodiments, multiple insert stiffeners 10 may be formed, shaped, stamped or otherwise provided in the manhole insert bottom 2. The manhole insert bottom 2 may be fitted with additional features (not illustrated) such as a pressure relief valve, lift handles and warning tags, for example and without limitation. A manhole insert sidewall 3 may extend upwardly from an outer edge of the manhole insert bottom 2. A manhole insert flange 4 may extend outwardly from the manhole insert sidewall 3. The manhole insert flange 4 may have a manhole insert flange bottom surface 5. As illustrated in FIG. 3, a manhole insert interior 8 may be formed by and between the manhole insert bottom 2 and the manhole insert sidewall 3.

A manhole insert gasket 11 may be provided on the manhole insert flange bottom surface 5 of the manhole insert flange 4. The manhole insert gasket 11 may include at least one annular gasket cord 12, 14. In some embodiments, the manhole insert gasket 11 may include an annular inner gasket cord 12 and an annular outer gasket cord 14. Each of the inner gasket cord 12 and the outer gasket cord 14 may have a generally semicircular cross-section. The inner gasket cord 12 and the outer gasket cord 14 of the manhole insert gasket 11 may be disposed in concentric relationship with respect to each other and with respect to the manhole insert bottom 2 and the manhole insert side wall 3 of the manhole insert 1. An annular inner gasket space 16 may be defined by and between the manhole insert side wall 3 and the inner gasket cord 12. An annular middle gasket space 18 may be defined by and between the inner gasket cord 12 and the outer gasket cord 14. An outer gasket space 19 may be defined by and between the outer gasket cord 14 and the flange edge 4a of the manhole insert flange 4.

Figure 4:
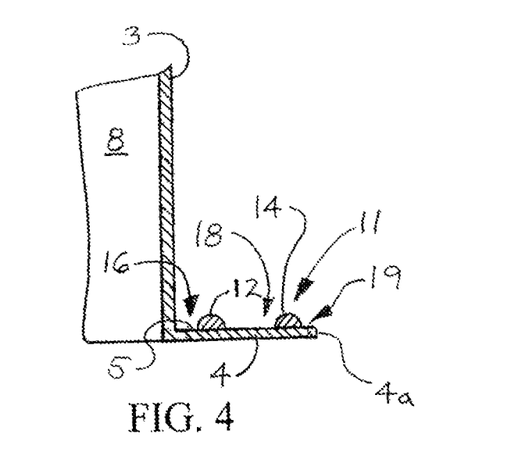
FIG. 4 is an enlarged sectional view, taken along section line 4 in FIG. 3.
Figure 4A:
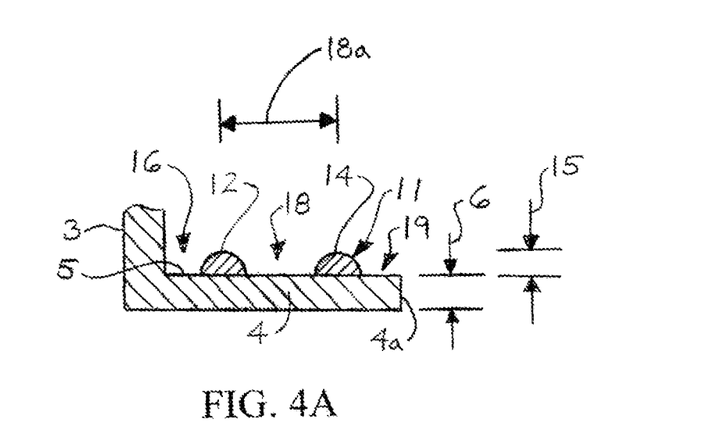
FIG. 4A is an enlarged sectional view of that illustrated in FIG. 4, more particularly illustrating a typical flange thickness of a manhole insert flange on a manhole insert and a typical gasket thickness of a manhole insert gasket on the manhole insert flange.
Figure 5:
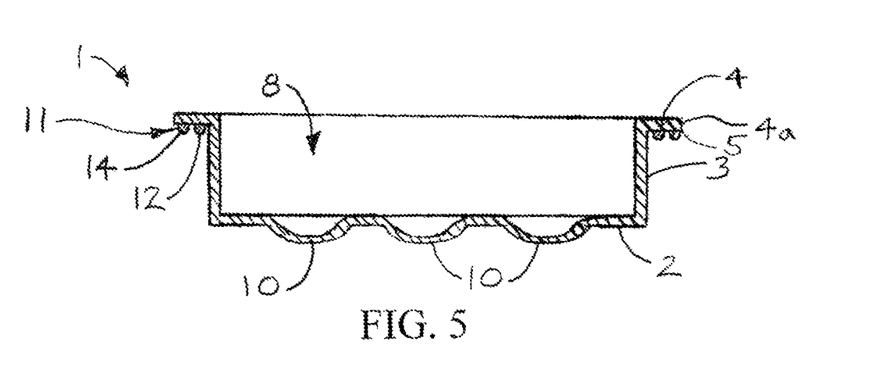
FIG. 5 is a cross-sectional view taken along section lines 5-5 in FIG. 2.

As illustrated in FIG. 4A, in some embodiments, the middle gasket space 18 may have a middle gasket space width 18a of about 7 mm. The manhole insert flange 4 may have a flange thickness 6 of about 1.66 mm. The inner gasket cord 12 and the outer gasket cord 14 of the manhole insert gasket 11 may each have a gasket thickness 15 of about 1.59 mm. Accordingly, the manhole insert flange 4 and the manhole insert gasket 11 may together have a total thickness of about 3.25 mm.

The inner gasket cord 12 and the outer gasket cord 14 of the manhole insert gasket 1I may be fabricated of a material and according to a process which will be hereinafter described. In some embodiments, the inner gasket cord 12 and the outer gasket cord 14 of the manhole insert gasket 11 may be fabricated by application and curing of a liquid gasket material which includes a synthetic silicone elastomer. The manhole insert gasket 11 may be compatible with the material of which the manhole insert 1 is fabricated to form a long-lasting bond under wet or dry conditions. In some embodiments, the manhole insert gasket 11 may have the following physical properties:

Tensile strength: 335 psi—ASTM D412 Elongation (400-600%)—ASTM D412

Shore Hardness: 25 Shore A—ASTM D2240

Adhesion to Stainless: 580 psi—ASTM D4541/D7234

In some embodiments, the manhole insert gasket 11 may be fabricated of 733 glass and metal sealant silicone black which is available from Dow Corning Corp. The 733 glass and metal sealant is a one-component, non-slumping silicone paste which offers an unprimed adhesion, moisture cure, flexibility and resistance to extreme temperatures, moisture, weathering and vibrations. The 733 glass and metal sealant has a cure time of 24 hours @ room temperature, elongation of 500%, hardness of 25A, a service temperature of −57° C.-177° C., specific gravity of 1.04@25° C., tack free time of 15 min. and tensile strength of 335 psi.

Figure 7:
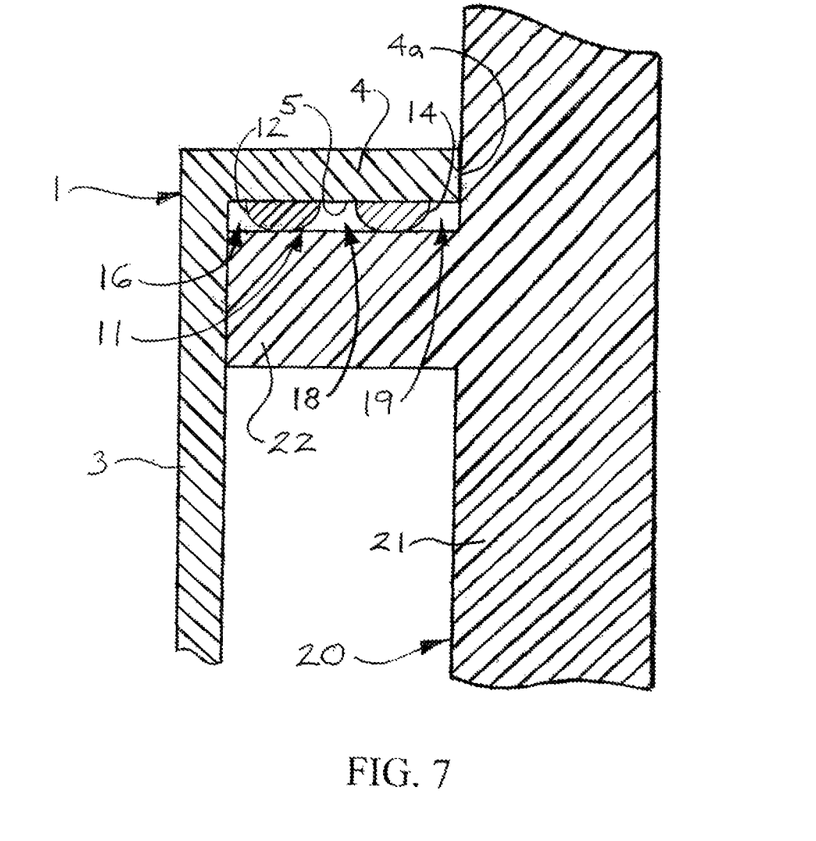
FIG. 7 is an enlarged sectional view, taken along section line 7 in FIG. 6.

Referring next to FIGS. 6 and 7 of the drawings, in typical application, the manhole insert 1 is placed in the manhole opening 24 with the manhole insert gasket 11 seated on the manhole shoulder 22 in the manhole structure frame 21 of the manhole structure 20. Accordingly, as illustrated in FIG. 7, the inner gasket cord 12 and the outer gasket cord 14 of the manhole insert gasket 11 may be compressed between the manhole structure shoulder 22 of the manhole structure 20 and the manhole insert flange 4 of the manhole insert 1. The inner gasket space 16, the middle gasket space 18 and the outer gasket space 19 may accommodate the inner gasket cord 12 and the outer gasket cord 14 as each expands outwardly under the weight of the manhole insert flange 4 against the manhole structure shoulder 22. A manhole cover 28 (FIG. 6) may be placed on the manhole structure frame 21 to close the manhole opening 24 above the manhole insert 1.

During heavy rain and other precipitation, the manhole insert 1 prevents rainwater and other precipitation and/or floodwater from entering the sewer system 26 through the manhole opening 24. This in turn, prevents the sewer system 26 from overflowing through the manhole opening 24 to the ground or roadway surface. The manhole insert gasket 11 imparts a liquid-tight seal between the manhole insert flange 4 and the underlying manhole structure shoulder 22 to prevent seepage of water and/or sewerage between the manhole insert flange 4 and the manhole shoulder 22. It will be appreciated by those skilled in the art that the manhole insert gasket 11 exhibits enhanced liquid sealing characteristics as well as enhanced longevity to prevent or reduce the necessity or frequency of replacing the manhole insert 1 or the manhole insert gasket 11 on the manhole insert flange 4. Moreover, the inner gasket cord 12 and the outer gasket cord 14 ensure continued sealing capability of the manhole insert gasket 11 since in the event that one is compromised, the other may remain intact. This expedient enhances the longevity of the manhole insert 1 in the manhole structure 20.

Figure 8:
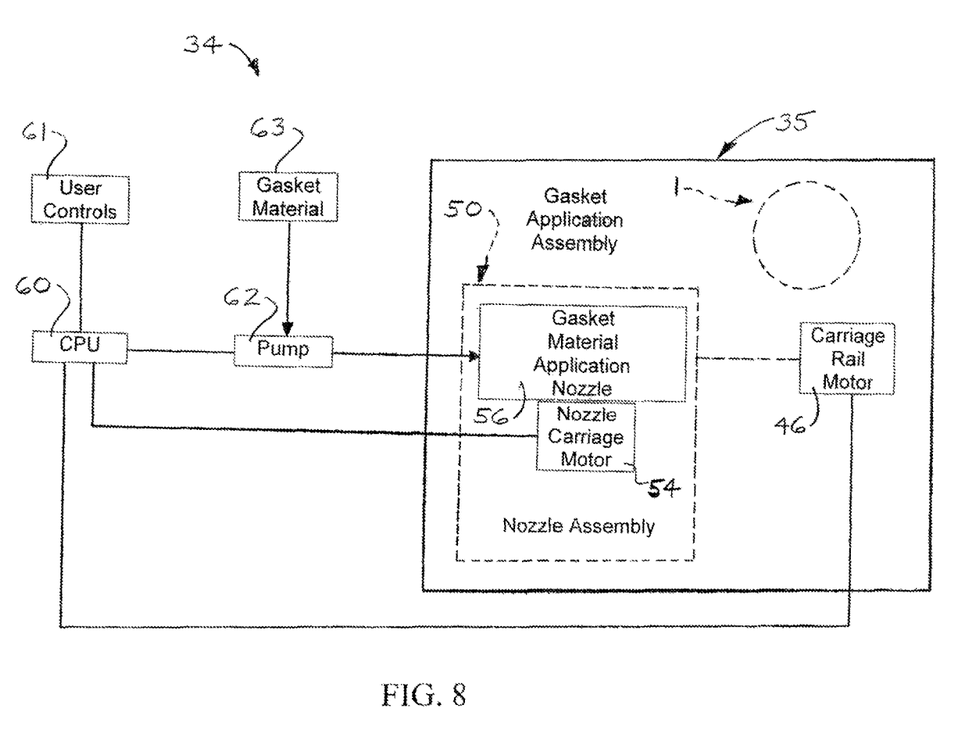
FIG. 8 is a functional block diagram which illustrates a typical gasket application system suitable for applying a manhole insert gasket on a manhole insert flange of a manhole insert.
Figure 9:
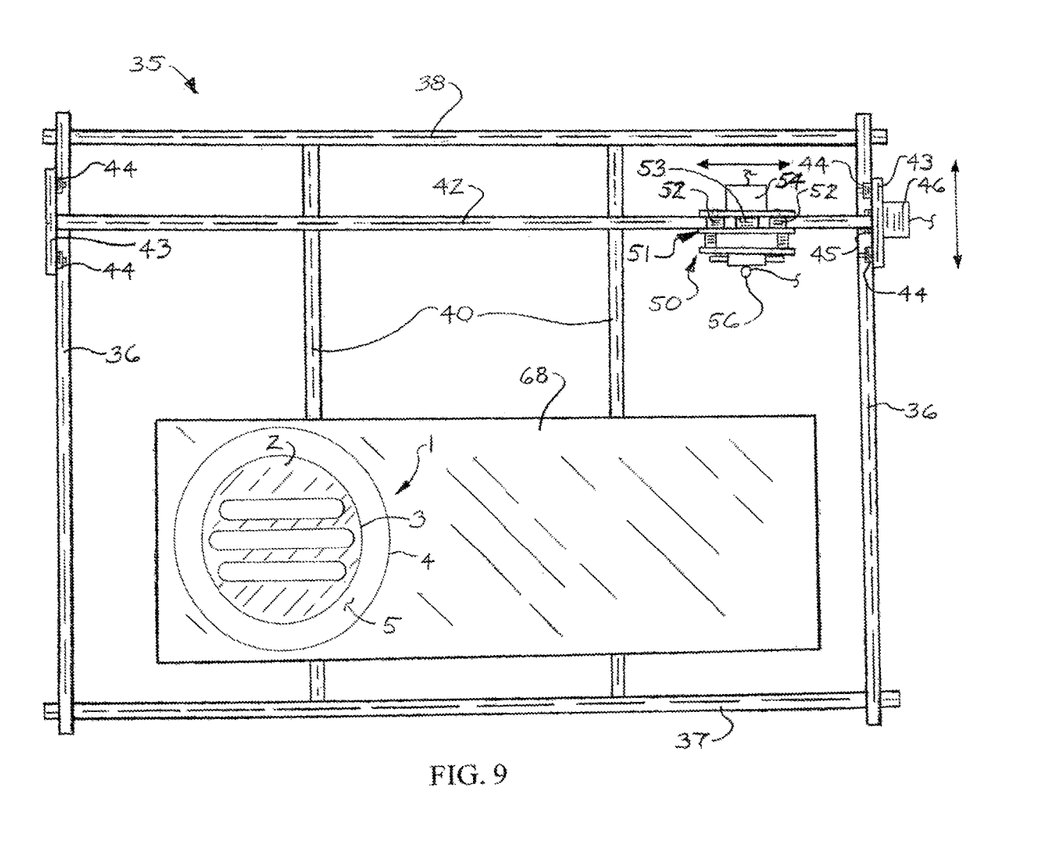
FIG. 9 is a top view of a typical gasket application assembly of the gasket application system, preparatory to application of the manhole insert gasket on the manhole insert flange of the manhole insert.
Figure 10:
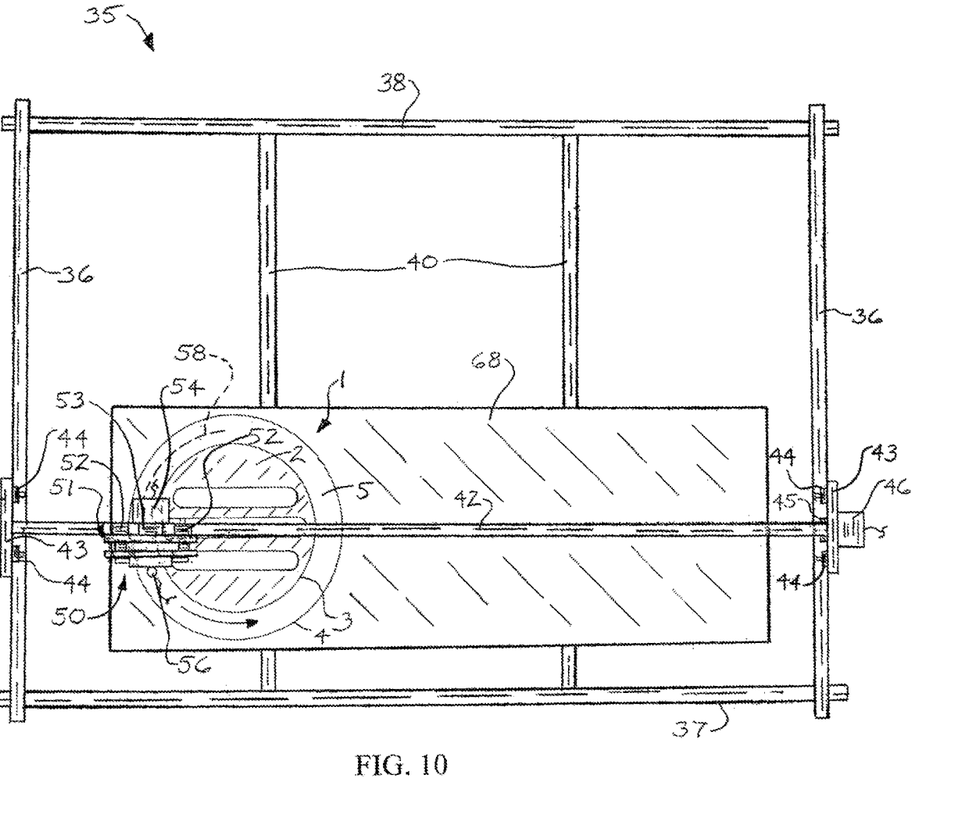
FIG. 10 is a top view of the gasket application assembly illustrated in FIG. 9, more particularly illustrating movement of a gasket material application nozzle in a circular dispensing path to dispense a liquid gasket material on the manhole insert flange of the manhole insert in typical application of the manhole insert gasket on the manhole insert flange.

Referring next to FIGS. 8-13 of the drawings, a typical gasket application system 34 which is suitable for application of the manhole insert gasket 11 to the manhole insert flange 4 of the manhole insert 1 is illustrated in FIGS. 8-10. The gasket application system 34 may include a gasket application assembly 35. As illustrated in FIGS. 9 and 10, in some embodiments, the gasket application assembly 35 may include a pair of generally elongated, parallel, spaced-apart assembly side rails 36. An elongated front rail connecting member 37 and an elongated rear rail connecting member 38 may extend between the assembly side rails 36 in parallel, spaced-apart relationship to each other. A pair of elongated, parallel, spaced-apart assembly rail stabilizing members 40 may extend between the front rail connecting member 37 and the rear rail connecting member 38. As further illustrated in FIGS. 9 and 10, in typical application of the gasket application system 34, which will be hereinafter described, the assembly rail stabilizing members 40 may support an insert support platform 68. The manhole insert 1 may be inverted and placed on the insert support platform 68 for fabrication of the manhole insert gasket 11 on the manhole insert flange bottom surface 5 of the manhole insert flange 4 typically in a manner which will be hereinafter described.

An elongated nozzle carriage rail 42 may be suitably adapted to bi-directionally traverse the assembly side rails 36 between the front rail connecting member 37 and the rear rail connecting member 38. Accordingly, a pair of nozzle carriage rail brackets 43 may be configured to bi-directionally traverse the respective assembly side rails 36. Each nozzle carriage rail bracket 43 may be fitted with carriage rollers 44 which engage the corresponding assembly side rail 36. A carriage rail motor 46 may be provided on one of the nozzle carriage rail brackets 43. The carriage rail motor 46 may drivingly engage a drive roller 45 which, in turn, drivingly engages the assembly side rail 36. Accordingly, the nozzle carriage rail 42 may bi-directionally traverse the assembly side rails 36 responsive to operation of the carriage rail motor 46.

A nozzle assembly 50 may be suitably adapted to bi-directionally traverse the nozzle carriage rail 42 between the assembly side rails 36. The nozzle assembly 50 may include a nozzle carriage 51 which may be fitted with carriage rollers 52 and a drive roller 53 that engage the nozzle carriage rail 42. A nozzle carriage motor 54 may drivingly engage the drive roller 53 such that the nozzle assembly 50 bi-directionally traverses the nozzle carriage rail 42 responsive to operation of the nozzle carriage motor 54.

A gasket material application nozzle 56 may be provided on the nozzle carriage 51 of the nozzle assembly 50. As illustrated in FIG. 8, a pump 62 may be disposed in fluid communication with the gasket material application nozzle 56. The liquid gasket material 63 which will be used to form the manhole insert gasket 11 may be disposed in fluid communication with the pump 62. A CPU 60 having user controls 61 may be operably connected to the pump 62. Accordingly, as illustrated in FIG. 10, in fabrication of the manhole insert gasket 1, as will be hereinafter described, the CPU 60 may operate the pump 62 to pump the liquid gasket material 63 to the gasket material application nozzle 56 at a selected rate and volume, typically responsive to programmed input from the user controls 61. The liquid gasket material 63 may be dispensed from the gasket material application nozzle 56 onto the manhole insert flange bottom surface 5 of the manhole insert flange 4 as the gasket material application nozzle 56 traverses a selected circular dispensing path 58 (FIG. 10) which defines the circumference of the corresponding inner gasket cord 12 and the outer gasket cord 14 of the manhole insert gasket 11.

As further illustrated in FIG. 8, the CPU 60 may further be operably connected to the carriage rail motor 46 and to the nozzle carriage motor 54 on the nozzle carriage 51 of the nozzle assembly 50. Accordingly, typically responsive to programmed input from the user controls 61, the CPU 60 may operate the carriage rail motor 46 and the nozzle carriage motor 54 in conjunction with each other in such a manner that the nozzle carriage 51 of the nozzle assembly 50 traverses the manhole insert flange 4 of the manhole insert 1 in the selected circular dispensing path 58 and at a selected speed for deposition of the inner gasket cord 12 and the outer gasket cord 14 of the manhole insert gasket 11 onto the manhole insert bottom surface 5 of the manhole insert flange 4.

Figure 11:
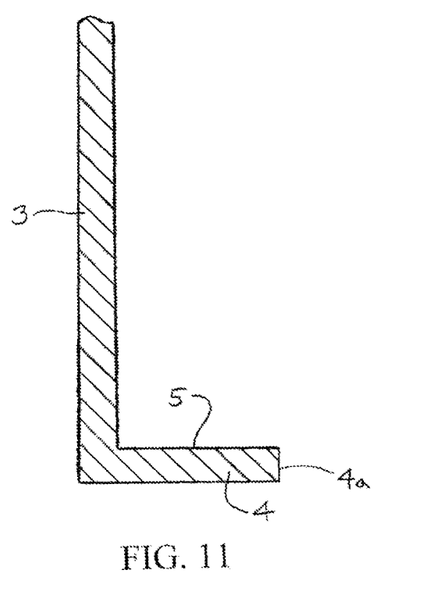
FIGS. 11-13 are enlarged sectional views of the manhole insert flange, illustrating typical sequential application of an inner gasket cord and an outer gasket cord of a manhole insert gasket on the manhole insert flange bottom surface of the manhole insert flange.
Figure 12:
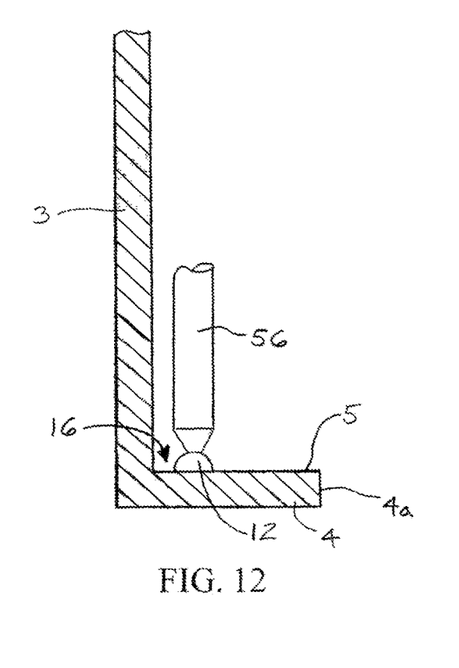
Figure 13:
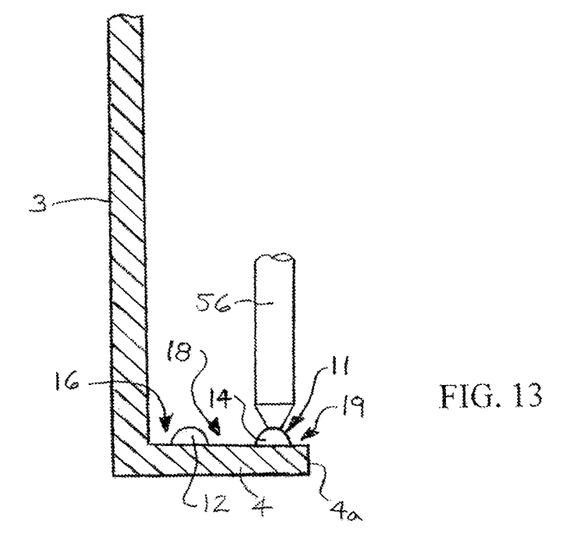

In typical fabrication of the manhole insert gasket 11 on the manhole insert 1, the manhole insert 1 may be inverted and placed on the insert support platform 68 of the gasket application assembly 35, with the manhole insert flange bottom surface 5 facing upwardly, as illustrated in FIG. 9. The liquid gasket material 63 (FIG. 8) may be prepared and poured or otherwise placed into a suitable vessel (not illustrated) which is disposed in fluid communication with the pump 62. Via the user controls 61, the CPU 60 may be programmed to operate the pump 62 at a selected speed to facilitate dispensing of the liquid gasket material 63 onto the manhole insert flange 4 at a selected volume and rate for fabrication of the respective inner gasket cord 12 and the outer gasket cord 14 of the manhole insert gasket 11. The CPU 60 may additionally be programmed to operate the carriage rail motor 46 and the nozzle carriage motor 54 of the nozzle carriage 51 at a selected rate and in a selected directional pattern or sequence to facilitate traversal of the gasket material application nozzle 56 along the corresponding circular dispensing path 58 (FIG. 10) for sequential deposition of the liquid gasket material 63 in fabrication of the inner gasket cord 12 and the outer gasket cord 14 on the manhole insert flange bottom surface 5 of the manhole insert flange 4, as illustrated in FIGS. 11-13.

After it is dispensed on the manhole insert flange 4, the liquid gasket material 63 may be allowed to cure and solidify. In some applications, talcum powder or the like (not illustrated) may be applied to the surface of the inner gasket cord 12 and outer gasket cord 14 to neutralize stickiness on the manhole insert gasket 11 after the gasket material 63 cures. After each of the inner gasket cord 12 and the outer gasket cord 14 cures, the manhole insert 1 may be removed from the insert support platform 68. The manhole insert 1 may subsequently be installed in a manhole structure 20, as was heretofore described with respect to FIG. 6.

Figure 14:
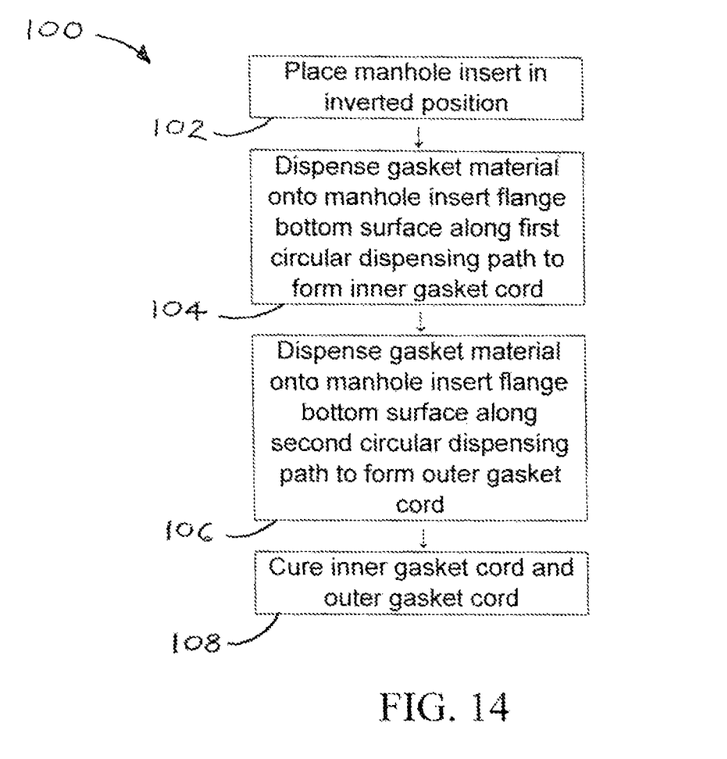
FIG. 14 is a flow diagram which illustrates an illustrative embodiment of a manhole insert gasket fabrication method.

Referring next to FIG. 14 of the drawings, a flow diagram which illustrates an illustrative embodiment of a manhole insert gasket fabrication method is generally indicated by reference numeral 100. At Step 102, a manhole insert may be placed in an inverted position. The manhole insert may include manhole insert bottom, a manhole insert sidewall extending from the manhole insert bottom and a manhole insert flange extending from the manhole insert sidewall. At Step 104, a liquid gasket material may be dispensed onto a bottom surface of a manhole insert flange along a first circular dispensing path to form an inner gasket cord of a manhole insert gasket. The liquid gasket material may include a synthetic silicone elastomer. At Step 106, the liquid gasket material may be dispensed onto the bottom surface of the manhole insert flange along a second circular dispensing path to form an outer gasket cord of the manhole insert gasket. At Step 108, the liquid gasket material of the inner gasket cord and the outer gasket cord may be cured. The manhole insert gasket may be subsequently installed in a manhole structure.

While the preferred embodiments of the disclosure have been described above, it will be recognized and understood that various modifications can be made in the disclosure and the appended claims are intended to cover all such modifications which may fall within the spirit and scope of the disclosure.

What is claimed is:

1. A method of fabricating a manhole insert gasket on a manhole insert flange of a manhole insert suitable for deployment in a manhole opening of a manhole structure, comprising:
 inverting the manhole insert having the manhole insert flange;
 forming the manhole insert gasket by dispensing a liquid gasket material onto the manhole insert flange along at least one circular dispensing path, the liquid gasket material including a synthetic silicone elastomer; and
 solidifying and hardening the gasket material by curing the gasket material to form the manhole insert gasket with the cured gasket material, whereby the manhole insert gasket with the cured gasket material remains exposed on the manhole insert flange prior to deployment of the manhole insert in the manhole opening.

2. The method of claim 1 wherein forming the manhole insert gasket comprises forming the manhole insert gasket having Shore Hardness of about 25 and an Adhesion to Stainless steel of about 580 psi.

3. The method of claim 1 wherein forming the manhole insert gasket comprises forming the manhole insert gasket having at least one annular gasket cord.

4. The method of claim 3 wherein forming the manhole insert gasket having the at least one annular gasket cord comprises forming the manhole insert gasket having the at least one annular gasket cord with a semicircular cross-section.

5. The method of claim 3 wherein forming the manhole insert gasket having the at least one annular gasket cord comprises forming the manhole insert gasket having the at least one annular gasket cord with a gasket thickness of about 1.59 mm.

6. The method of claim 3 wherein forming the manhole insert gasket having the at least one annular gasket cord comprises forming the manhole insert gasket including the synthetic silicone elastomer having a tensile strength of about 335 psi and an elongation of from about 400% to about 600%.

7. The method of claim 3 wherein forming the manhole insert gasket having the at least one annular gasket cord comprises forming the manhole insert gasket having an annular inner gasket cord and an annular outer gasket cord by dispensing the gasket material onto the manhole insert flange along a first circular dispensing path and a second circular dispensing path, respectively.

8. The method of claim 7 wherein forming the manhole insert gasket having the an inner gasket cord and the outer gasket cord by dispensing the gasket material onto the manhole insert flange along the first circular dispensing path and the second circular dispensing path, respectively, comprises forming the manhole insert gasket having a middle gasket space defined by and between the inner gasket cord and the outer gasket cord, the middle gasket space having a middle gasket space width of about 7 mm.

9. A method of fabricating a manhole insert gasket on a manhole insert flange of a manhole insert suitable for deployment in a manhole opening of a manhole structure, comprising:
 inverting the manhole insert having a manhole insert bottom, a manhole insert sidewall extending from the manhole insert bottom, a manhole insert interior formed by and between the manhole insert bottom and the manhole insert sidewall and the manhole insert flange extending from the manhole insert sidewall, the manhole insert bottom, the manhole insert sidewall and the manhole insert fluidly sealing the manhole insert interior;
 forming the manhole insert gasket having an annular inner gasket cord and an annular outer gasket cord by dispensing a liquid gasket material onto the manhole insert flange along a first circular dispensing path and a second circular dispensing path, respectively, the liquid gasket material including a synthetic silicone elastomer; and
 solidifying and hardening the gasket material by curing the gasket material to form the manhole insert gasket with the cured gasket material, whereby the manhole insert gasket with the cured gasket material remains exposed on the manhole insert flange prior to deployment of the manhole insert in the manhole opening.

10. The method of claim 9 wherein forming the manhole insert gasket having the annular inner gasket cord and the annular outer gasket cord comprises forming the manhole insert gasket having the annular inner gasket cord and the annular outer gasket cord each with a semicircular cross-section.

11. The method of claim 9 wherein forming the manhole insert gasket having the annular inner gasket cord and the annular outer gasket cord comprises forming the manhole insert gasket having the annular inner gasket cord and the annular outer asket cord each with a gasket thickness of about 1.59 mm.

12. The method of claim 9 wherein forming the manhole insert gasket having the annular inner gasket cord and the annular outer gasket cord comprises forming the manhole insert gasket including the synthetic silicone elastomer having a tensile strength of about 335 psi and an elongation of from about 400% to about 600%.

13. The method of claim 9 wherein forming the manhole insert gasket comprises forming the manhole insert gasket having Shore Hardness of about 25 and an Adhesion to Stainless steel of about 580 psi.

14. The method of claim 9 wherein forming the manhole insert gasket having the annular inner gasket cord and the annular outer gasket cord comprises forming the manhole insert gasket having the annular inner gasket cord and the annular outer gasket cord by dispensing the gasket material onto the manhole insert flange along a first circular dispensing path and a second circular dispensing path, respectively.

15. The method of claim 14 wherein forming the manhole insert gasket having the annular inner gasket cord and the annular outer gasket cord by dispensing the gasket material onto the manhole insert flange along the first circular dispensing path and the second circular dispensing path, respectively, comprises forming the manhole insert gasket having a middle gasket space defined by and between the annular inner gasket cord and the annular outer gasket cord, the middle gasket space having a middle gasket space width of about 7 mm.

16. A method of fabricating a manhole insert gasket on a manhole insert flange of a manhole insert suitable for deployment in a manhole opening of a manhole structure, comprising:
 inverting the manhole insert having a manhole insert bottom, a manhole insert sidewall extending from the manhole insert bottom, a manhole insert interior formed by and between the manhole insert bottom and the manhole insert sidewall and the manhole insert flange extending from the manhole insert sidewall, the manhole insert bottom, the manhole insert sidewall and the manhole insert flange fluidly sealing the manhole insert interior;

forming the manhole insert gasket having a discrete annular inner gasket cord and a discrete annular outer gasket cord structurally distinct from the inner gasket cord by dispensing a liquid gasket material onto the manhole insert flange along a first circular dispensing path and a second circular dispensing path, respectively, the liquid gasket material including a synthetic silicone elastomer having a tensile strength of about 335 psi and an elongation of from about 400% to about 600%; and solidifying and hardening the gasket material by curing the gasket material to form the manhole insert gasket with the cured gasket material whereby the manhole insert gasket with the cured gasket material remains exposed on the manhole insert flange prior to deployment of the manhole insert in the manhole opening.

17. The method of claim 16 wherein forming the manhole insert gasket having the annular inner gasket cord and the annular outer gasket cord comprises forming the manhole insert gasket having the annular inner gasket cord and the annular outer gasket cord each with a gasket thickness of about 1.59 mm.

18. The method of claim 16 wherein forming the manhole insert gasket having the annular inner gasket cord and the annular outer gasket cord by dispensing the gasket material onto the manhole insert flange along the first circular dispensing path and the second circular dispensing path, respectively, comprises forming the manhole insert gasket having a middle gasket space defined by and between the annular inner gasket cord and the annular outer gasket cord, the middle gasket space having a middle gasket space width of about 7 mm.

19. The method of claim 1 wherein forming the manhole insert gasket comprises forming the manhole insert gasket having Shore Hardness of about 25 and an Adhesion to Stainless steel of about 580 psi.

\* \* \* \* \*